Patented June 19, 1951

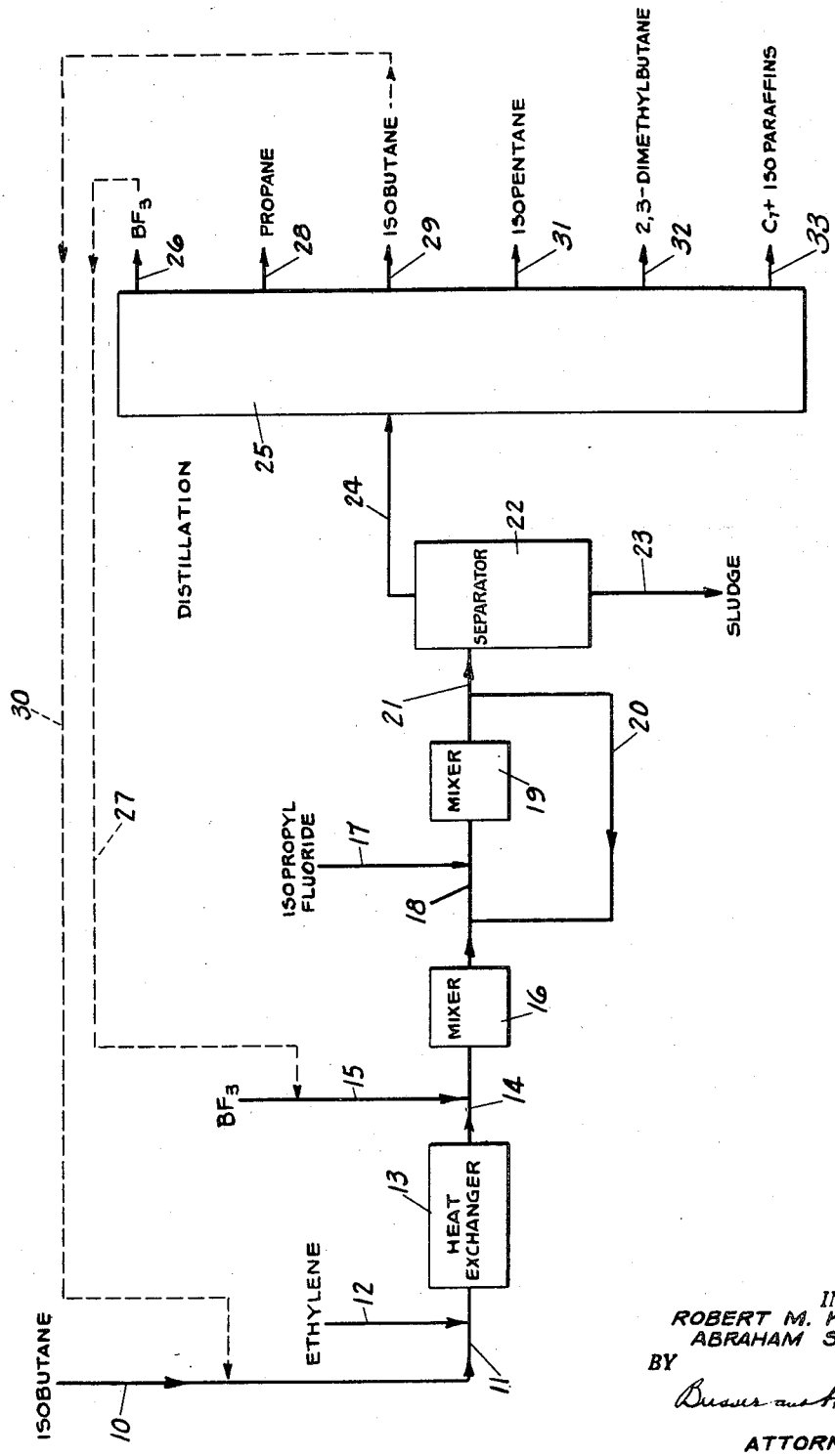

2,557,114

UNITED STATES PATENT OFFICE 2,557,114

PREPARATION OF 2,3-DIMETHYLBUTANE

Robert M. Kennedy, Newtown Square, and Abraham Schneider, Philadelphia, Pa., assignors to Sun Oil Company, Philadelphia, Pa., a corporation of New Jersey Application September 15, 1948, Serial No. 49,447

10 Claims. (Cl. 260—683.4)

This invention relates to the preparation of 2,3-dimethylbutane by the alkylation of isobutane with ethylene under novel catalytic conditions.

It is well known that 2,3-dimethylbutane, otherwise referred to as diisopropyl, may be prepared by alkylating isobutane with ethylene employing certain catalysts. Diisopropyl has become increasingly important in recent years as an additive for the preparation of high quality fuels for spark ignition engines due to its high antiknock qualities and good volatility. It has a high octane rating and excellent rich-mixture response, which render it especially useful for preparing high quality aviation fuels.

The catalysts which have been proposed heretofore for carrying out the alkylation of isobutane and ethylene include aluminum chloride with a promoter such as HCl, $BF_3$—$H_2O$—Ni complexes and $BF_3$—$H_2O$—HF complexes. These catalytic materials are insoluble in hydrocarbons or at least soluble only to a limited extent. When such catalysts are employed in conducting the reaction, it is therefore necessary to effect intimate contact between the hydrocarbon phase and the catalyst phase, and usually a mechanically agitated reactor is provided for continuously agitating the reactants and catalyst during the reaction period. This adds considerably to the expense of the operation with respect both to installation charges and operating costs.

According to the present invention, the alkylation of isobutane and ethylene is carried out under novel catalytic conditions such that the reaction is effected in homogeneous phase. The components constituting the catalyst are an alkyl fluoride and $BF_3$. Each of these are soluble in the reactants at least in the concentrations employed, so that the reaction does not depend upon contact between two separate phases.

The process of the invention comprises bringing together an alkyl fluoride and $BF_3$ in the presence of isobutane and ethylene at a suitable temperature as hereinafter more fully set forth, whereby a catalytic condition becomes established that causes the alkylation reaction to take place immediately. In bringing together the alkyl fluoride and $BF_3$, the alkyl fluoride can be introduced into a mixture of the reactants to which $BF_3$ has already been added, or the $BF_3$ can be introduced into a solution of the alkyl fluoride in the reactants, or both of the catalytic components can be introduced simultaneously but separately into the reactants. It is also permissible first to dissolve one of the catalytic components in either the isobutane or ethylene and the other in the other reactant and then bring together the separate mixtures to effect reaction. It is not permissible, however, to premix the alkyl fluoride and $BF_3$ and then add the mixture to the hydrocarbons, for in such case the catalytic condition will be immediately spent when the alkyl fluoride and $BF_3$ are brought into contact with each other.

The alkyl fluoride employed should have at least two carbon atoms per molecule. It may be a primary fluoride (i. e. one having the fluorine atom attached to a primary carbon atom), a secondary fluoride (i. e. where the fluorine atom is attached to a secondary carbon atom) or a tertiary fluoride (i. e. where the fluorine atom is attached to a tertiary carbon atom). Any primary, secondary or tertiary alkyl fluoride, other than methyl fluoride, is operative in combination with $BF_3$ to promate the alkylation of isobutane and ethylene to form 2,3-dimethylbutane.

The temperature at which such reaction will be obtained varies, however, with the particular alkyl fluoride employed. We have found that when the fluoride is a tertiary fluoride, the temperature should be in excess of —20° C. At lower temperatures, while a reaction will take place, it will comprise largely the reaction of ethylene with the tertiary fluoride to form a primary fluoride of higher molecular weight, with the alkylation reaction between isobutane and ethylene proceeding only to a minor extent.

When the alkyl fluoride is a secondary fluoride, the temperature should be in excess of —90° C. At temperatures below this value, a secondary fluoride in combination with $BF_3$ has little catalytic effect. At temperatures higher than —90° C., the alkylation of isobutane with ethylene will take place without any substantial reaction of the fluoride with ethylene as occurs in the case when a tertiary fluoride is employed at temperatures below —20° C.

When the alkyl fluoride is a primary fluoride, the reaction temperature should be above —10° C. in order to obtain substantial catalytic action. Ethyl fluoride, however, has been found to be somewhat more inert than the primary fluorides having three or more carbon atoms per molecule and requires a temperature of at least about +20° C. in order to give rise to substantial catalytic action. Methyl fluoride in combination with $BF_3$ does not give any substantial catalytic effect at least at temperatures below +150° C. and is not considered within the scope of the present invention.

The reaction may, if desired, be carried out at much higher temperatures than the minimum values above specified, and no definite maximum temperature can be given for all cases. In practice the maximum temperature which may be employed usually will depend upon the pressure under which the available equipment is adapted to operate or upon the desired degree of purity of the 2,3-dimethylbutane. As a general rule, it will be desirable to operate at all times at temperatures below +150° C. and usually well below this value. It is noteworthy, however, that the use of the present type of catalytic agents permits the isobutane-ethylene alkylation to be conducted over a much wider range of temperatures than are employed in the known processes using other catalysts.

As specific examples of primary fluorides which may be used in practicing the process, the following may be mentioned by way of illustration: ethyl fluoride; n-propyl fluoride; n-butyl fluoride; isobutyl fluoride; n-amyl fluoride; isoamyl fluoride; 1-fluoro-2-methylbutane; n-hexyl fluoride; and similar fluoride derivatives of hexanes, heptanes, octanes or the like. As specific illustrations of secondary fluorides, the following may be mentioned: isopropyl fluoride; 2-fluoro-butane; 2-fluoro-3-methylbutane; and 2-fluoro-3,3-dimethylbutane. A few specific examples of tertiary fluorides are: t-butyl fluoride; t-amyl fluoride; 2-fluoro-2,3-dimethylbutane and other t-hexyl fluorides; t-heptyl fluorides; and 4-fluoro-2,2-4-trimethylpentane and other t-octyl fluorides. It will be understood that the specific compounds named above are given merely by way of illustration and that any alkyl fluoride (with the exception of methyl fluoride) will produce an operative catalytic combination with $BF_3$ provided the temperature is above the minimum values as set forth above.

In alkylation processes generally, some reaction other than straight alkylation of the isoparaffin with the olefin invariably occur along with the main alkylation reaction. This is also true of alkylations conducted according to the present process. Accordingly, the total reaction product contains other hydrocarbons in addition to the $C_6$ product of the isobutane-ethylene alkylation. A relatively small amount of $C_7$ hydrocarbons and a considerably larger amount of $C_8$ hydrocarbons are formed. Also the product contains a considerable amount of $C_9$ and heavier hydrocarbons. However, these other products of the reaction are also isoparaffins of highly branched structure and are likewise useful for preparing high quality fuels. Where it is desired to obtain the 2,3-dimethylbutane in high concentration, it may be separated from the other hydrocarbons by distillation. On the other hand, where it is not desired to separate the 2,3-dimethylbutane, the total hydrocarbon product or so much thereof as has a suitable boiling range may be used directly for the manufacture of aviation or other motor fuels.

It is noteworthy that the total $C_6$ fraction of the reaction product of the present process is composed mainly of 2,3-dimethylbutane and in many cases, especially when the reaction is conducted at relatively low temperature, will consist essentially of 2,3-dimethylbutane substantially free of any of its isomers. This is advantageous in that it readily permits the separation of the 2,3-dimethylbutane from the other hydrocarbon products in an unusually high state of purity. By way of contrast, heretofore known processes for alkylating isobutane with ethylene generally yield the 2,3-dimethylbutane in admixture with substantial amounts of other hexanes of inferior antiknock value.

The accompanying drawing is a diagrammatic flow-sheet illustrating one manner of conducting the process.

Referring now to the flow-sheet, isobutane enters the system through line 10 and is passed through line 11 wherein it is mixed with ethylene which is introduced through line 12. The proportion of isobutane to ethylene may vary widely but it is generally desirable to use a molar excess of the isobutane in order to minimize polymerization of the ethylene. On the other hand, as the concentration of isobutane in the reaction mixture is increased, there is a tendency to promote self-alkylation of the isobutane, or in other words to cause the isobutane to react with itself to form $C_8$ hydrocarbons, and it is therefore desirable to avoid the use of isobutane in such high proportions as to cause the self-alkylation reaction to predominate over the isobutane-ethylene alkylation. Molar proportions of isobutane to ethylene varying from 1:1 to 8:1 are suitable, although the process may also be practiced with lower or higher proportions.

The mixture of isobutane and ethylene flows through heat exchanger 13, which may be either a cooler or heater dependent upon the temperature at which it is desired to conduct the reaction. The reactants, at the desired temperature, leave the exchanger 13 through line 14 and are then mixed first with one of the catalytic components and then with the other. For purpose of illustration, the $BF_3$ is considered as the catalytic component which is added to the reactants first, following which the alkyl fluoride is introduced into the $BF_3$-containing mixture; but it is to be understood that the reverse order of addition also may be used. Also, in the accompanying drawing, the alkyl fluoride is illustrated as isopropyl fluoride, although any other alkyl fluoride as herein previously specified can be used in place of isopropyl fluoride.

$BF_3$ is introduced through line 15 into the reactant stream flowing through line 14 and mixes therewith in mixer 16 to form a solution of $BF_3$ in the hydrocarbons. It will be apparent that if there is sufficient turbulence in line 14 to effect rapid mixing, mixer 16 may be omitted. The amount of $BF_3$ to employ is not critical and a very small amount is sufficient, upon the subsequent addition of the alkyl fluoride, to establish the necessary catalytic condition.

After the addition of $BF_3$, the alkyl fluoride, shown as isopropyl fluoride, is introduced through line 17 into the $BF_3$-hydrocarbon mixture flowing through line 18. It is desirable to add a sufficient proportion of the alkyl fluoride to effect complete consumption of the ethylene during the reaction. This amount will be subject to variation dependent upon other operating conditions but generally will be in excess of 0.05 mole of alkyl fluoride per mole of ethylene charged. It is seldom if ever advantageous to employ a proportion in excess of 1.0 mole per mole of ethylene unless it is desired also to effect self-alkylation of the excess isobutane.

A catalytic condition becomes established immediately upon contact of the isopropyl fluoride and $BF_3$, and reaction of the hydrocarbons starts immediately. The mixture passes through mixer 19 (which may be omitted if turbulence in the flow line is sufficient), and the hydrocarbon reactions proceed rapidly under the catalytic influence of the $BF_3$-alkyl fluoride combination.

It is advantageous to recycle the reaction mixture from mixer 19 through line 20 back into line 18 and to introduce the isopropyl fluoride through line 17 slowly relative to the rate of recycling. This will insure against a high concentration of isopropyl fluoride at the locus of its introduction into the reactants. By thus maintaining the isopropyl fluoride concentration low, it has been found that the yield of 2,3-dimethylbutane will be substantially increased.

Upon completion of the reaction, the mixture becomes heterogeneous due to separation of a sludge from the hydrocarbon phase. A stream of the reaction mixture may be continuously withdrawn from mixer 19 and sent through line 21 into separator 22 wherein separation of the two phases is allowed to occur. The sludge settles to the bottom of the separator and is withdrawn through line 23. This material contains fluorine derived from the alkyl fluoride together with $BF_3$ in some sort of complex form. If desired, means (not shown) may be provided for recovering $BF_3$ from the sludge and re-using the same. This may be done, for example, by heating the sludge to drive off $BF_3$ and HF and then recovering the $BF_3$ from the evolved vapors by fractional distillation.

The hydrocarbon product is withdrawn from separator 22 through line 24 and is sent to distillation zone 25 for separation of the components. Distillation zone 25 usually will comprise a plurality of separate distillation steps suitable for making the separations indicated. The lowest boiling component will be the $BF_3$ which has remained dissolved in the hydrocarbon layer. As indicated, this may be withdrawn through line 26 and may be returned for re-use through line 27.

As shown in the drawing, propane is the next lower boiling constituent obtained from the reaction mixture and is removed through line 28. This compound is formed during the reaction from the isopropyl fluoride. It has been found that the alkyl fluoride employed will be converted, at least in part, during the reaction to the corresponding hydrocarbon. Consequently, if an alkyl fluoride other than isopropyl fluoride is used, some other hydrocarbon will be obtained rather than propane. For example, if tertiary butyl fluoride is used, it will be converted to isobutane and no provision for removal of propane need be made in such case.

The excess isobutane may be separated by distillation and withdrawn through line 29, whence it may be returned by means of line 30 for re-use.

As a general rule, a relatively small amount of isopentane will be produced, evidently through disproportionation of the isobutane with $C_6$ or higher boiling hydrocarbon products of the reaction. As shown, provision may be made for removing the isopentane through line 31.

The next higher boiling material is the $C_6$ product which is removed through line 32. As previously indicated, the $C_6$ fraction is composed at least mainly of 2,3-dimethylbutane and in fact may be substantially pure 2,3-dimethylbutane. Low reaction temperature favors high purity. It has been found that at temperatures below $+20°$ C., the $C_6$ fraction usually is composed essentially of 2,3-dimethylbutane without any substantial amount of its isomers. On the other hand, at a temperature of, for example, $+100°$ C., the $C_6$ fraction will contain a substantial proportion of 2-methylpentane, which compound has considerably lower antiknock qualities than 2,3-dimethylbutane. It will therefore often be desirable to carry out the reaction at a temperature below $+20°$ C.

The remainder of the reaction product, which is withdrawn through line 33, is composed of $C_7$ and higher boiling isoparaffins. This product also has utility in the preparation of aviation or other motor fuels.

The following examples illustrate specific embodiments of the invention:

Example I

Three runs (A, B and C) were made at different temperatures ($0°$ C., $20°$ C. and $100°$ C. respectively) using isopropyl fluoride as the alkyl fluoride in each run. The procedure was first to charge the isobutane, ethylene and isopropyl fluoride into a contactor provided with stirrer and then introducing $BF_3$ by bubbling it into the mixture. After introduction of the $BF_3$ a period of contact of about 45–60 minutes was allowed during which the mixture was stirred, but from observation of pressure variations within the contactor it was apparent that the reaction in each case took place immediately upon addition of the $BF_3$. Upon standing the reaction mixture separated into an organic layer and a dark lower layer containing $BF_3$ in a complex form. The layers were separately withdrawn and the hydrocarbon layer was water washed. It was found that $BF_3$ and HF could be evolved and recovered from the lower layer by heating. From the hydrocarbon layer components boiling below the $C_6$ range were removed by distillation. The product representing $C_6$ and heavier hydrocarbons was distilled under efficient fractionating conditions and the distillate cuts were subjected to infrared analysis. Results are summarized as follows:

|  | Run A | Run B | Run C |
|---|---|---|---|
| Reaction temperature, °C | 0 | 20 | 100 |
| Charge: |  |  |  |
| isobutane, g | 223 | 221 | 225 |
| ethylene, g | 53 | 31 | 48 |
| isopropyl fluoride, g | 16 | 21 | 22 |
| $BF_3$, g | 10 | 10 | 10 |
| Yield of $C_5+$ product, g | 37 | 57 | 85 |
| Yield of $C_6+$ product, g | 36 | 57 | 82 |
| Composition of $C_6+$ product, vol. per cent: |  |  |  |
| $C_6$ | 13 | 21 | 28 |
| $C_7$ | 6 | 8 | 11 |
| $C_8$ | 23 | 19 | 18 |
| $C_9$ and heavier | 58 | 52 | 43 |
| Composition of $C_6$ fraction, vol. per cent: |  |  |  |
| 2,3-dimethylbutane | 100 | 99 | 75 |
| 2-methylpentane |  | 1 | 25 |

These results indicate that while the yield of $C_6$ product increases as the reaction temperature increases, its purity with respect to 2,3-dimethylbutane decreases.

Example II

In this example isopropyl fluoride was again used as the alkyl fluoride, but the reaction temperature was $-80°$ C. and the isopropyl fluoride was introduced into a solution of $BF_3$ in the hydrocarbons. More specifically, the isopropyl fluoride (22.6 g.) was dissolved in a portion (31 g.) of the isobutane and this solution was then introduced, over a period of 9 minutes, into a pressure reaction vessel to which the mixture of $BF_3$, ethylene and remaining isobutane had already been added. After completion of the reaction, the hydrocarbon product was separated from the sludge and water washed, and was then distilled, first to remove any components boiling below the $C_5$ range and then to remove isopentane formed during the reaction. The residue was then subjected to distillation under high fractionating conditions. The following results were obtained:

| | |
|---|---|
| Reaction temperature, °C | −80 |
| Charge: | |
| Isobutane, g | 115 |
| Ethylene, g | 16 |
| BF$_3$, g | 6 |
| Isopropyl fluoride, g | 22.6 |
| Yield of C$_5$+ product, g | 60 |
| Yield of C$_6$+ product, g | 48 |
| Composition of C$_6$+ product, vol. per cent: | |
| C$_6$ | 23 |
| C$_7$ | 7 |
| C$_8$ | 43 |
| C$_9$ and heavier | 27 |
| Composition of C$_6$ fraction, vol. per cent: | |
| 2,3-dimethylbutane | 100 |

It is noteworthy that under the conditions of this run, not only was the C$_6$ fraction essentially pure 2,3-dimethylbutane as in run A of the preceding example but the yield of 2,3-dimethylbutane based on the amount of ethylene charged was considerably higher than in run A.

*Example III*

In this example a tertiary alkyl fluoride, namely, tertiary butyl fluoride, was employed at a temperature of 0° C., using the technique of slowly adding the alkyl fluoride (44 g.) dissolved in a portion (58 g.) of the isobutane to the other components over a period of about 42 minutes. Results were as follows:

| | |
|---|---|
| Reaction temperature, °C | 0 |
| Charge: | |
| Isobutane, g | 204 |
| Ethylene, g | 19 |
| BF$_3$, g | 6 |
| Tertiary butyl fluoride, g | 44 |
| Yield of C$_5$+ product, g | 70 |
| Yield of C$_6$+ product, g | 63 |
| Composition of C$_6$+ product, vol. per cent: | |
| C$_6$ | 24 |
| C$_7$ | 10 |
| C$_8$ | 35 |
| C$_9$ and heavier | 31 |
| Composition of C$_6$ fraction, vol. per cent: | |
| 2,3-dimethylbutane | 100 |

Here, again, a relatively good yield of essentially pure 2,3-dimethylbutane was obtained.

It will be understood that the foregoing examples are merely illustrative specific embodiments of the invention and that wide deviation from the specific reaction conditions therein shown are permissible.

This application is a continuation-in-part of our copending application, Serial No. 38,167, filed July 10, 1948.

Having described our invention, what we claim and desire to protect by Letters Patent is:

1. Method of preparing 2,3-dimethylbutane by the instantaneous alkylation in homogeneous phase of isobutane with ethylene which comprises reacting isobutane and ethylene in the presence of a catalyst comprising an admixture of BF$_3$ and an alkyl fluoride having at least two carbon atoms per molecule at a temperature sufficient to effect said instantaneous homogeneous phase reaction, said temperature being in the range of from −90° C. to 150° C.

2. Method according to claim 1 wherein there is separated from the reaction product a C$_6$ fraction composed mainly of 2,3-dimethylbutane.

3. Method of preparing 2,3-dimethylbutane by the instantaneous alkylation in homogeneous phase of isobutane with ethylene which comprises reacting isobutane and ethylene in the presence of a catalyst comprising an admixture of BF$_3$ and a tertiary alkyl fluoride at a temperature sufficient to effect said instantaneous homogeneous phase reaction, said temperature being in the range of from −20° C. to 150° C.

4. Method according to claim 3 wherein the alkyl fluoride is tertiary butyl fluoride and the molar ratio of isobutane to ethylene is within the range of 1:1 to 8:1.

5. Method of preparing 2,3-dimethylbutane by the instantaneous alkylation in homogeneous phase of isobutane with ethylene which comprises reacting isobutane and ethylene in the presence of a catalyst comprising an admixture of BF$_3$ and a secondary alkyl fluoride at a temperature sufficient to effect said instantaneous homogeneous phase reaction, said temperature being in the range of from −90° C. to 150° C.

6. Method according to claim 5 wherein the alkyl fluoride is isopropyl fluoride and the molar ratio of isobutane to ethylene is within the range of 1:1 to 8:1.

7. Method of preparing 2,3-dimethylbutane by the instantaneous alkylation in homogeneous phase of isobutane with ethylene which comprises reacting isobutane and ethylene in the presence of a catalyst comprising an admixture of BF$_3$ and a primary alkyl fluoride having at least 3 carbon atoms per molecule at a temperature sufficient to effect said instantaneous homogeneous phase reaction, said temperature being in the range of from −10° C. to 150° C.

8. Method of preparing 2,3-dimethylbutane by the instantaneous alkylation in homogeneous phase of isobutane with ethylene which comprises introducing an alkyl fluoride having at least two carbon atoms per molecule into a mixture of isobutane and ethylene containing dissolved BF$_3$ at a temperature sufficient to effect said instantaneous homogeneous phase reaction, said temperature being in the range of from −90° C. to 150° C.

9. Method according to claim 8 wherein the alkyl fluoride is tertiary butyl fluoride.

10. Method according to claim 8 wherein the alkyl fluoride is isopropyl fluoride.

ROBERT M. KENNEDY.
ABRAHAM SCHNEIDER.

REFERENCES CITED

The following references are of record in the file of this patent:

UNITED STATES PATENTS

| Number | Name | Date |
|---|---|---|
| 2,304,290 | Van Peski | Dec. 8, 1942 |
| 2,366,736 | Linn et al. | Jan. 9, 1945 |
| 2,410,108 | Sachanen et al. | Oct. 29, 1946 |
| 2,411,483 | Wachter et al. | Nov. 19, 1946 |